United States Patent [19]

Edrich et al.

[11] Patent Number: 4,852,865

[45] Date of Patent: Aug. 1, 1989

[54] HOLDING DEVICE ON A PUNCH PRESS

[75] Inventors: Günter Edrich, Münchweiler/Rodalb; Klaus Deppert, Pirmasens, both of Fed. Rep. of Germany

[73] Assignee: Schön & CIE. GmbH, Pirmasens, Fed. Rep. of Germany

[21] Appl. No.: 106,376

[22] Filed: Oct. 7, 1987

[51] Int. Cl.[4] .......... B23Q 1/00

[52] U.S. Cl. .......... 269/48; 269/52

[58] Field of Search .......... 269/47–52

[56] References Cited

FOREIGN PATENT DOCUMENTS 27640 2/1982 Japan .......... 269/47

*Primary Examiner*—Gene Wan

*Attorney, Agent, or Firm*—Goodman & Teitelbaum

[57] ABSTRACT

The invention relates to a holding device for the stack of paper, cardboard or similar sheet-form punching material on a punch press, with a centering pin yielding elastically at least in zones under the thrust of the punching material for engagement into centering holes of the punching material sheets. For the improvement of such a holding device, according to the invention the centering pin, preferably rigid in itself, with smooth or substantially smooth surface, is suspended both tilting and also movable thrusting in or parallel to the plane of the punching table perpendicularly and parallel to the stack edge.

16 Claims, 2 Drawing Sheets

HOLDING DEVICE ON A PUNCH PRESS

BACKGROUND OF THE INVENTION

The invention relates to a holding device for the stack of paper, cardboard or similar sheet-form punching material on a punch press, with a centering pin yielding elastically at least in areas under the thrust of the punching material in the punching process for engagement in centering holes of the punching material sheets. Such holding devices serve the purpose of pushing the sheet stack shifted in the punching process by the penetration of punch knife back into its starting position.

In a known holding device according to W. German utility model DE-GBMS No. 73 30 085 the centering pin consists of a spiral tension spring which is fastened with an end piece to a base plate and carries on its upper end a rounded cusp. The use of the spiral spring has proved only limitedly successful, because the sheets may get stuck in the surface grooved through the spring turns of the centering pin. For the aligning of the sheet stack there are necessary, further, at least two stop bars which are arranged with respective centering pin on a common base plate. The base plate hampers the stack in its movability in the punching.

SUMMARY OF THE INVENTION

The problem of the present invention is to propose a holding device of the type of the category which with the simplest possible construction and easy handling assures a dependable positioning and a trouble-free returning of the sheet stack into the starting position after a punching.

This problem is solved with the invention substantially by the means that the centering pin, preferably rigid in itself, with smooth or substantially smooth surface is movably suspended both tilting and also shifting in or parallel to the plane of the punching table preferably perpendicular and parallel to the adjacent stack edge. Through the fact that the centering pin is smooth or substantially smooth on its surface there is no longer present the danger of sticking of the sheet-form punching material. While in the prior-known solution forces for the returning of the sheet stack into the starting position must be provided by the centering ping pin itself by reason of its construction as a helical spring, in the invention the functions of centering by means of a rigid pin and of returning by means of separate spring or other elastic elements are separated. It is further assured that the centering pin can tilt, but also move thrusting in or parallel to the plane of the punching table and, namely, preferably both perpendicular and also parallel to the adjacent stack edge, so that all shifts to which a stack is subjected in the punching process are completely taken into account and a dependable return of the stack into the starting position can occur after the punching process, by means of springs, other elastic elements and/or a piston-cylinder arrangement.

Here it is proposed with the invention to make the centering pin tiltable as much as possible about a center of rotation which lies in the rear lower end zone of the centering pin, preferably about at the rear circumferential end of the centering pin. In this manner it for the centering pin in the starting rest position to be seated substantially with one smooth lower face surface on the punching table, without the tilting possibility being impaired.

In a special development of the invention the centering pin is preferably insertable in a swinging piece which on its part is conducted tiltably in a bearing arrangement which which is supported with respect to this by means of a spring or similar elastic element.

The swinging piece may be guided by means at least one horizontal guide bolt in the bearing arrangement in at least one arcuate oblong hole with the center of rotation as center.

There at least one oblong hole is provided preferably in a separate bearing piece of the bearing arrangement.

The swinging piece is supported in this case preferably by means of the spring or the like elastic element on the bearing piece.

The bearing piece itself preferably presents a three-point centering.

For this purpose the bearing piece may for example be arranged to swing about a vertical pivot bolt.

A stable arrangement nevertheless assuring all desired possibilities of the centering pin is achieved if the bearing piece is conducted between a horizontal base plate and a horizontal cover plate.

As further feature of the invention it is proposed that the pivot bolt be received in an oblong hole of the bearing piece, the longitudinal axis of the oblong hole running in rest position perpendicular to the stack edge. The oblong hole assures the shiftability of the bearing piece and therewith also of the centering pin perpendicularly to the stack edge, without impairment to the the possibility of movement substantially parallel to the stack edge by swinging of the bearing piece.

For the realization of the thought of the invention it can further be of advantage if the bearing piece presents a preferably rear conical centering section which in rest position is taken up between two rolls of a preferably fork-shaped pressure piece of the bearing arrangement, where—together with the pivot bolt—the three-point centering already mentioned can be realized in a simple manner.

An especially simple constructive solution of the problem posed is present when the pressure piece is guided, preferably by means of the earlier-mentioned rolls, between two guide bars preferably fastened at least to the base plate in direction of movement perpendicular to the edge of the stack.

The pressure piece abuts preferably on a pressure spring active in a direction perpendicular to the stack edge or similar elastic element and/or a correspondingly active piston-cylinder arrangement, so that the bearing piece and therewith also the swinging piece with the centering pin can execute all desired movements easily during the punching process.

Further aims, features, advantages and possibilities of application of the present invention are yielded from the following description of examples of execution with the aid of the appended drawing. There, all described and/or pictorially represented features by themselves or in any reasonable combination form the object of the present invention.

DESCRIPTION OF THE PREFERRED EMBODIMENT

Figure 1:
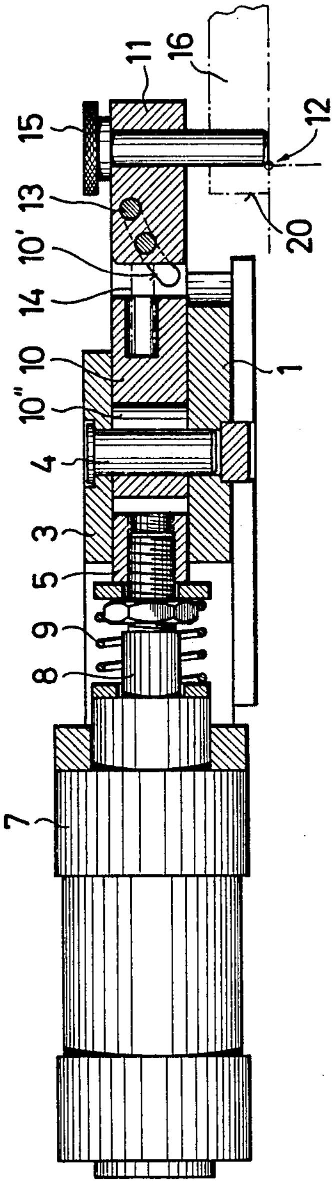
FIG. 1 shows in side view, partially sectioned, a holding device according to the invention, in which the centering pin engages into the centering holes of the punching material sheets lying one over another in the stack.
Figure 3:
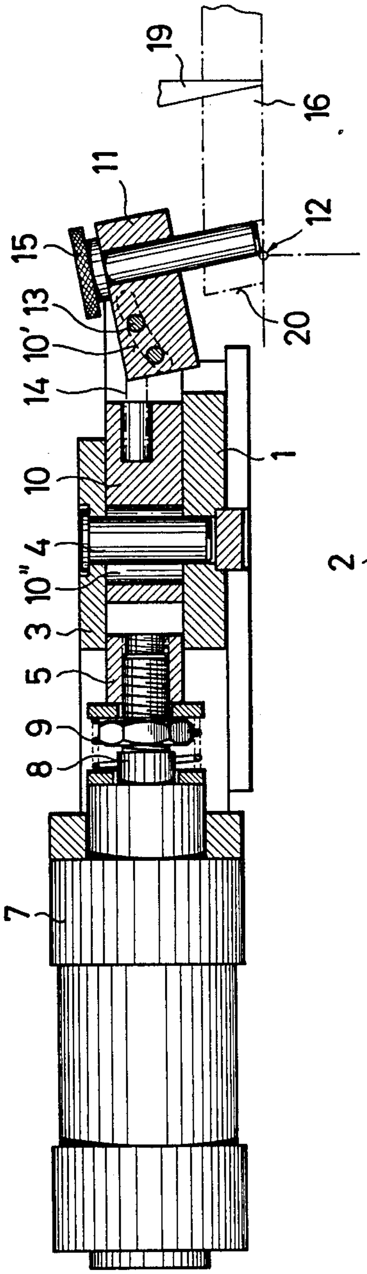
FIG. 3 shows a representation of the holding device corresponding to FIG. 1, but immediately on conclusion of a punching operation with tilted centering pin
Figure 4:
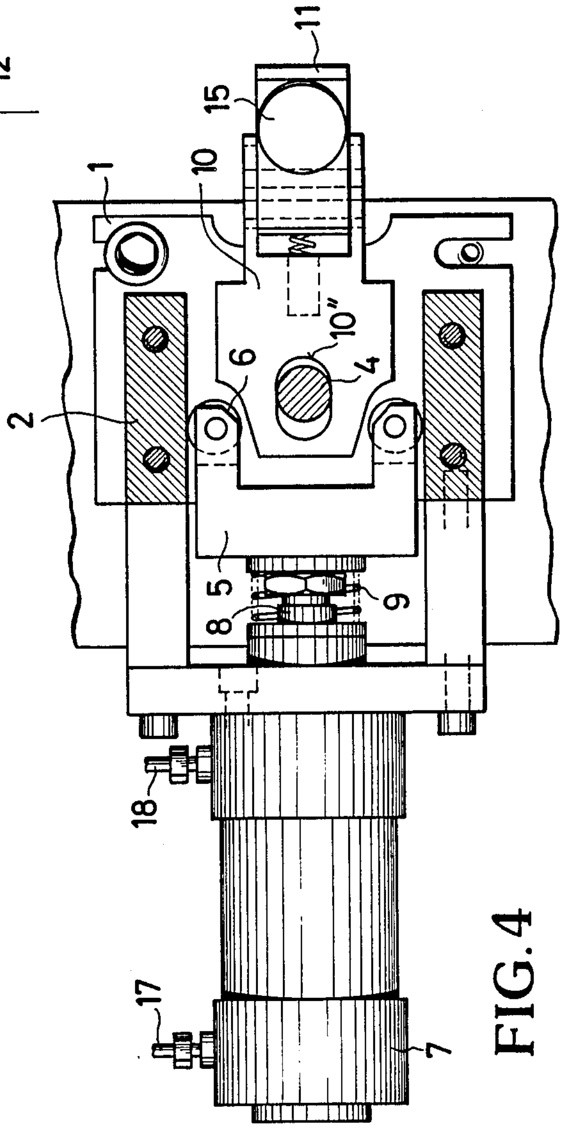
FIG. 4 shows the holding device in the position of FIG. 3 in plan view, likewise with cover plate removed.

The holding device according to FIG. 1 has a base plate 1, which is fastenable to a punch press table. To the base plate 1 there are laterally screwed two guide bars 2. With the guide bars 2 there is screwed a cover plate 3. Between base plate 1 and cover plate 3 there is held a pivot bolt 4, which cooperates with an oblong hole 10'' of a bearing piece 10. The longitudinal axis of the oblong hole 10'' runs, in the rest position to be seen from FIGS. 1 and 2, perpendicular to the stack edge 20 of the sheet stack 16 lying on the punching table (not represented). On its front end the bearing piece 10 carries a swinging piece 11 swingable in a recess. The swinging piece 11 can be tilted to the rear against the action of a pressure spring 14 and is guided in the process by means of guide bolts 13 that are seated fast in the swinging piece 11 and engage on both sides in arcuate oblong holes 10', whose fictive center is the axis of rotation 12 of a centering pin 15 inserted in the front end of the swinging piece 11. The pivot point 12 lies in correspondence to FIG. 1 at the rear end of the bolt circumference, so that the tilting movement (cf. FIG. 3) is facilitated. The pressure spring 14 is seated with its rear part in a depression of the bearing piece 10 and holds the swinging piece 11 before the punching process against the possible tilting movement in the starting rest position. At the rear end the bearing piece 10 has a conical taper on which in the starting rest position shown in FIG. 2 there engage on both sides rolls 6 of a fork-shaped pressure piece 5 and therewith center the bearing piece 10. The pressure piece 5 is guided by means of the same rolls 6 on the guide bars 2 for the outer centering. The rear end of the pressure piece 5 abuts on a pressure spring 9 constructed in the case represented in streamlined form, within which there is received the piston rod 8 of a piston-cylinder arrangement 7, the piston rod 8 being fastened to the pressure piece 5. The pressure spring 9 holds the pressure piece 5 against the bearing piece 10 in its centering under light bias tension. The piston-cylinder arrangement 7 is provided with an air feed 17 for the fixing of the pressure piece 5 and therewith centering and fixing of the bearing piece 10, of the swinging piece 11 and of the centering pin 15, as well as with an air feed 18 for the releasing of the bearing arrangement 5 to 10 for the centering pin 15. In the fixing the piston rod 8 is shifted in the direction of the stack 16, in the releasing in opposite direction. The position of the pressure piece 5 after the releasing, by action on the piston-cylinder arrangement 7 over the air feed 18 is illustrated in FIG. 4. There it is evident that by the retraction of the fork-shaped pressure piece 5 the bearing piece 10 is freed for all desired horizontal movement directions about the pivot bolt 4. By action on the piston-cylinder arrangement over the air line 17, possibly supproted by the pressure spring 9, the pressure piece 5 is again thrust forward for the centering of the bearing piece 10 after the punching process.

Figure 2:
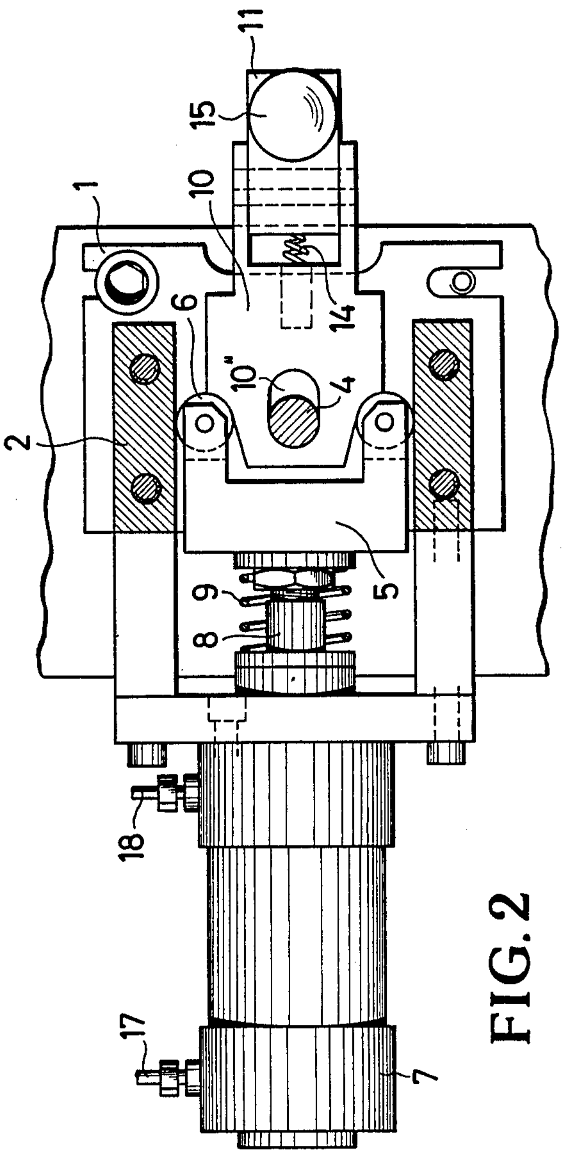
FIG. 2 shows the holding device of FIG. 1 in plan view with cover plate removed.

The holding device of the invention is used as follows: At first holding devices in the starting rest position represented in FIGS. 1 and 2 are spaced from one another in the vicinity of the stack edge 20 of a sheet stack 16 to be punched. The correspondingly punched stack 16 of paper, cardboard or similar sheet-form punching material is thrust under the holding device and fixed with the centering pins 15 of the two holding devices provided at a distance from one another in the border zone of the stack 16. Punching is then performed. Especially when the punching approaches closer to the holding devices, therefore to the stack edge 20, the wedge action of the punching knife 19 with respect to the respective centering pin 15 becomes active. In each punching operation either the air pressure if removed from the piston-cylinder arrangement 7 or the pressure piece 5 is driven back into the position illustrated in FIG. 4. The bearing piece 10 can then yield to the pressure of the stack 16 counter to the relatively light pressure spring 9. The centering pin 15 can, furthermore, tilt to the rear by means of the guide bolts 13 in the oblong holes 10' about the center of rotation 12. When the punch knife 19 again withdraws from the stack 16, the piston-cylinder arrangement 7 is again acted upon or ventilated, so that the bearing piece 10 either under the action of the piston rod 8 and/or the action of the pressure spring 9 returns into the starting rest position of FIG. 2. The centering pin 15, after completion of the punching process, is pressed by the pressure spring 14 into its starting rest position and thereby sets the stack 16 straight again.

The pressure spring 9 is not absolutely required. It is also possible to operate without it or with reduced pressure of the piston-cylinder arrangement 7. The pressure piece 5 can further be withdrawn from the piston-cylinder arrangement 7, as already mentioned, so that the bearing piece 10 is completely freely movable.

List of reference numbers

1 Base plate
2 Guide bars
3 Cover plate
4 Pivot bolt
5 Fork-shaped pressure piece
6 Rolls
7 Piston-cylinder arrangement
8 Piston rod
9 Pressure spring
10 Bearing piece, 10', 10'' oblong holes
11 Swinging piece
12 Center of rotation
13 Guide bolt
14 Pressure spring
15 Centering pin
16 Stack
17 Air feed line (fixing)
18 Air feed line (releasing)
19 Punching knife
20 Stack edge

We claim:

1. Holding device for a stack (16) of paper, cardborad or similar sheet-form punching material on a punching table of a punch press having a punching knife (19), the punching material having centering holes, said holding device comprising:

a centering pin (15) for engagement into the centering holes of the punching material;

said centering pin (15) being rigid and having a substantially smooth surface; and means for movably suspending said centering pin (15) relative to the punching table to permit said centering pin (15) to be both tiltingly and also thrustingly movable in or parallel to a plane of the punching table so that said centering pin (15) can elastically yield perpendicular and parallel to an adjacent edge (20) of the stack (16) when the punching material is thrust by a wedge action of the punching knife (19).

2. Holding device according to claim 1, characterized in that the centering pin (15) is tiltable about a center of rotation (12) which lies in a rear lower end portion of the centering pin (15) at a rear circumferential end of the centering pin (15).

3. Holdig device according to claim 1, characterized in that the centering pin (15), insertably, is held in a swinging piece (11) which on its part is guided tiltably on a bearing arrangement (5 to 10) and is supported with respect to this by means of a spring (14) or similar elastic element.

4. Holding device according to claim 3, characterized in that the swinging piece (11) is guided by at least one horizontal guide bolt (13) on the bearing arrangement (5 to 10) in at least one arcuate oblong hole (10') with a pivot point (12) as center.

5. Holding device according to claim 3, characterized in that there is provided at least one oblong hole (10') in a bearing piece (10) of the bearing arrangement (5 to 10).

6. Holding device according to claim 5, characterized in that the swinging piece (11) is supported by means of the spring (14) or similar elastic element on the bearing piece (10).

7. Holding device according to claim 5, characterized in that the bearing piece (10) has a three-point centering.

8. Holding device according to claim 5, characterized in that the bearing piece (10) is arranged to move horizontally about a vertical pivot bolt (4).

9. Holding device according to claim 5, characterized in that the bearing piece (10) is guided between a horizontal base plate (1) and a horizontal cover plate (3).

10. Holding device according to claim 8, characterized in that the pivot bolt (4) is fastened to a base plate (1) and a cover plate (3).

11. Holding device according to claim 8, characterized in that the pivot bolt (4) is received in an oblong hole (10'') of the bearing piece (10), the longitudinal axis of a oblong hole (10'') running in rest position perpendicular to the adjacent stack edge (20).

12. Holding device according to claim 5, characterized in that the bearing piece (10) presents a rear conic centering section which in rest position is taken up between two rolls (6) of a forked pressure piece (5) of the bearing arrangement (5 to 10).

13. Holding device according to claim 12, characterized in that the pressure piece (5) by means of the rolls (6) is guided between two guide bars (2) fastened at least to a base plate (1) in direction of movement perpendicular to the adjacent stack edge (20).

14. Holding device according to claim 12, characterized in that the pressure piece (5) is supported on a pressure spring (9) or similar elastic element and a piston-cylinder arrangement (7, 8) active in a direction perpendicular to the stack edge (20).

15. Holding device according to claim 12, characterized in that the pressure piece (5) is supported on a pressure spring (9) or similar elastic element active in a direction perpendicular to the stack edge (20).

16. Holding device according to claim 12, characterized in that the pressure piece (5) is supported on a piston-cylinder arrangement (7, 8) active in a direction perpendicular to the stack edge (20).

* * * * *